United States Patent
Kapsambelis et al.

(10) Patent No.: US 7,639,144 B2
(45) Date of Patent: Dec. 29, 2009

(54) SYSTEM AND METHOD OF VALIDATING ASSET TRACKING CODES

(75) Inventors: Christos B. Kapsambelis, Pocasset, MA (US); Peter M. Collins, Portsmouth, RI (US); David J. Collins, Duxbury, MA (US)

(73) Assignee: a2b Trackin Solutions, Providence, RI (US)

( * ) Notice: Subject to any disclaimer, the term of this patent is extended or adjusted under 35 U.S.C. 154(b) by 348 days.

(21) Appl. No.: 11/636,481

(22) Filed: Dec. 11, 2006

(65) Prior Publication Data

US 2007/0150356 A1    Jun. 28, 2007

Related U.S. Application Data (60) Provisional application No. 60/749,606, filed on Dec. 13, 2005.

(51) Int. Cl.
*G08B 13/14* (2006.01)
(52) U.S. Cl. .................. 340/572.4; 340/10.4; 710/36
(58) Field of Classification Search ............ 340/572.1, 340/572.4, 10.1, 10.4, 10.41; 370/310; 707/100; 714/699, 799, 811, 48, 57; 710/36
See application file for complete search history.

(56) References Cited

U.S. PATENT DOCUMENTS

| | | | |
|---|---|---|---|
| 6,237,051 B1 | 5/2001 | Collins | |
| 2005/0071193 A1* | 3/2005 | Kalies | 705/2 |
| 2005/0140502 A1* | 6/2005 | Ashizawa | 340/10.52 |
| 2006/0288003 A1* | 12/2006 | Desai et al. | 707/6 |

\* cited by examiner

*Primary Examiner*—Thomas J Mullen
(74) *Attorney, Agent, or Firm*—L. J. Marhoefer (57) ABSTRACT

A system and method for validating adherence of an UII identifier code to one of several prescribed DOD codes by means of a programmed series of tests. First the code is tested for a prescribed header and a last character message. If one or the other is not found, the process stops and an error message is displayed. Field separator characters are identified that divide the message into fields. If the header, end of message character, and field separator are found and tested successfully, the program proceeds, and searches for an identifier of one of the DOD prescribed semantic formats. The semantic format identifier is extracted and tested. If valid, the process proceeds. If not, an error message is displayed. In proceeding, each field is stored, and the data from each field is extracted in accordance with the format identifier that had been extracted.

9 Claims, 10 Drawing Sheets

SYSTEM AND METHOD OF VALIDATING ASSET TRACKING CODES

RELATED APPLICATIONS

This application claims the priority of U.S. Provisional Application 60/749,606 filed on Dec. 13, 2005, which is incorporated herein by reference.

FIELD OF THE INVENTION

This invention relates to a system and method for enterprise wide tracking of assets by means of codes, and more particularly to an improved system for validating codes whose formats are prescribed.

BACKGROUND OF THE INVENTION

There is a presently an existing recognition of the need to track assets on an enterprise wide basis. U.S. Pat. No. 6,237,051 entitled "Asset Tracking Within and Across Enterprise Boundaries" teaches the use of a unique code affixed to an asset that can be scanned and inputted into a database. In order to insure the valuation, accountability, and control of Department of Defense property, it has issued "Department of Defense Guide to Uniquely Identifying Items" Version 1.5 which is incorporated herein by reference. As will be appreciated by those skilled in the art, for unique item identifier (UII) data elements to be readable by any reader device, the data elements must be identified so the reader device can recognize what element it is reading. In constructing machine-readable data elements, three types of data qualifiers are being used by the Department of Defense: Data Identifiers (DIs) (Format 06), Application Identifiers (AIs) (Format 05), and Text Element Identifiers (TEIs) (Format DD). In order for such a system to be successful in practice, there must a system and method for reliably and efficiently determining that a given code assigned to an item is in compliance with one of the several prescribed formats.

SUMMARY OF THE INVENTION

An object of this invention is the provision of a system and method that can perform a validation function on a given UII code to see if its semantics, syntax, and identifier messages conform any one of several DOD prescribed UII data.

Briefly this invention contemplates a system and method for validating adherence of an UII identifier code to one of several prescribed DOD codes by means of a programmed series of tests. First the code is tested for a prescribed header and a last character message. If one or the other is not found, the process stops and an error message is displayed. Field separator characters are identified that divide the message into fields. If the header, end of message character, and field separator are found and tested successfully, the program proceeds, and searches for an identifier of one of the DOD prescribed semantic formats. The semantic format identifier is extracted and tested. If valid, the process proceeds. If not, an error message is displayed. In proceeding, each field is stored, and the data from each field is extracted in accordance with the format identifier that had been extracted. For each field with a text element identifier of concatenated unique item identifier, the syntax is tested, and the result displayed. The remaining fields are then tested and the results displayed. These fields contain data relating to one or more of the following categories, depending upon the format, namely: serial number, part number, enterprise identifier, and issuing agency code, for example.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 3A and 3B extract and validate Application Identifier formatted data when identified in the process of FIG. 2; FIGS. 4A and 4B extract and validate Data Identifier formatted data when identified in the process of FIG. 2; and FIGS. 5A, 5B, 6, 7A and 7B extract and validate Text element Identifier formatted data when identified in the process of FIG. 2.

DETAILED DESCRIPTION OF THE INVENTION

Figure 1:
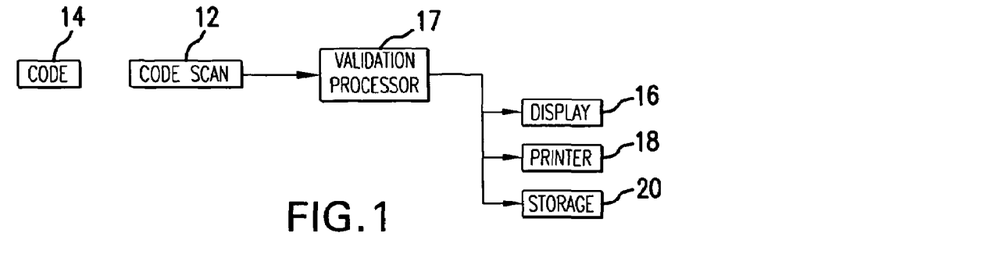
FIG. 1 is a block diagram of the functional components used in validating a code in accordance with the teachings of this invention.

Referring now to FIG. 1 of the drawings, the functional components of the validation process include a scanner 12 that reads a code label 14 and produces a binary code output. The code label may be any of several labels known in the art, such as a two dimensional bar code, or an RFID transponder. The output of the scanner 12 in this preferred embodiment is an ASCII code. The output of the scanner 12 serves as an input to a validation processor 17 that executes a program in accordance with the logic steps illustrated and explained in connection with FIG. 2, and the results are displayed on a monitor 16 and/or printed out by a printer 18. The results can also be stored in a digital storage device 20 in order to respond to audit and other informational requests.

Figure 2:
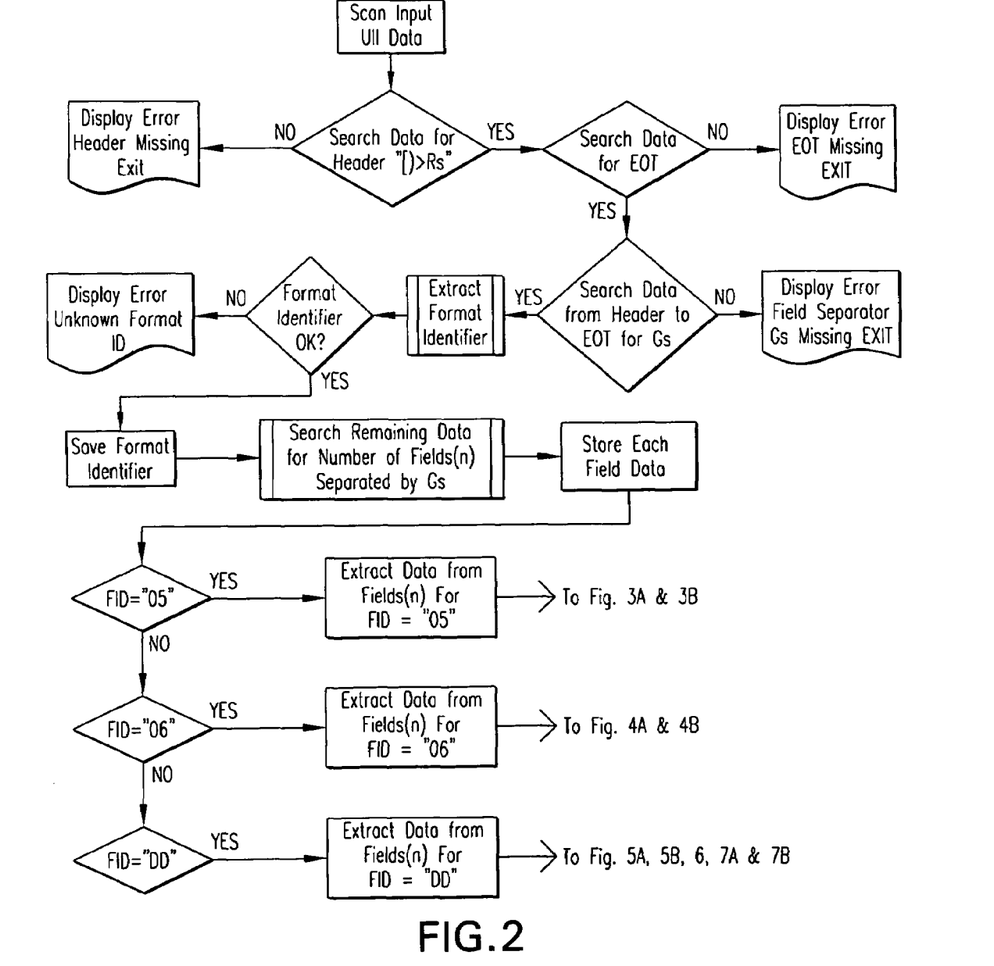
FIGS. 2, 3A, 3B, 4A, 4B, 5A, 5B, 6, 7A, and 7B comprise together a functional logic diagram and flow chart of one embodiment of a validation system and method in accordance with the teachings of this invention. Specifically, FIG. 2 validates and extracts a format identifier.

Referring now to FIG. 2, the process starts with the scan input ASCII data that is presumed to include one of several (here three) DOD prescribed Unique Item Identifier (UTI) codes. This input is initially searched by the program for a prescribed header, in this specific example, which includes the nonprintable ASCII record separator Rs, as shown. If the program decision box "Search Data for Header" displays an error "Header Missing", the program exits. If the prescribed header is found, the decision box "Search Data for EOT" looks for the last character of the message EOT. If not found, the error message "EOT Missing" is displayed, and the program exits. If found, the program searches the data for the first occurrence the field separator Gs in the decision box "Search Data from Header to EOT for Gs". If the field separator is not found, an error message "Field Separator Gs Missing" is displayed and the program exits. The program box "Extract Format Identifier" extracts a set of characters that precede the field separator Gs in order to identify one of the valid Unique Item Identifier codes. In this example the Format Identifier (FID) codes are: Data Identifiers (DIs) (Format 06), Application Identifiers (AIs) (Format 05), and Text Element Identifiers (TEIs) (DD). The extracted characters are checked to see if they conform to one of the prescribed formats in decision box "Format Identifier OK?" and if not an error "Unknown Format ID" is displayed and the program exits. If the format is OK, the identifier is saved, box "Save Format Identifier", and the program searches the data for the number of additional fields and stores each data field in blocks "Search Remaining Data for Number of Fields (n) separated by Gs" and "Store Each Field Data" respectively, where n represents the number of data fields in a given UII scanner output. As illustrated in FIG. 2A, data is extracted from the fields n depending on which FID has been extracted and saved in blocks "Extract Data from Fields (n) For FID="05", "Extract Data from Fields (n) For FID="06", and "Extract Data from Fields (n) For FDI="DD" respectively.

Figure 3A:
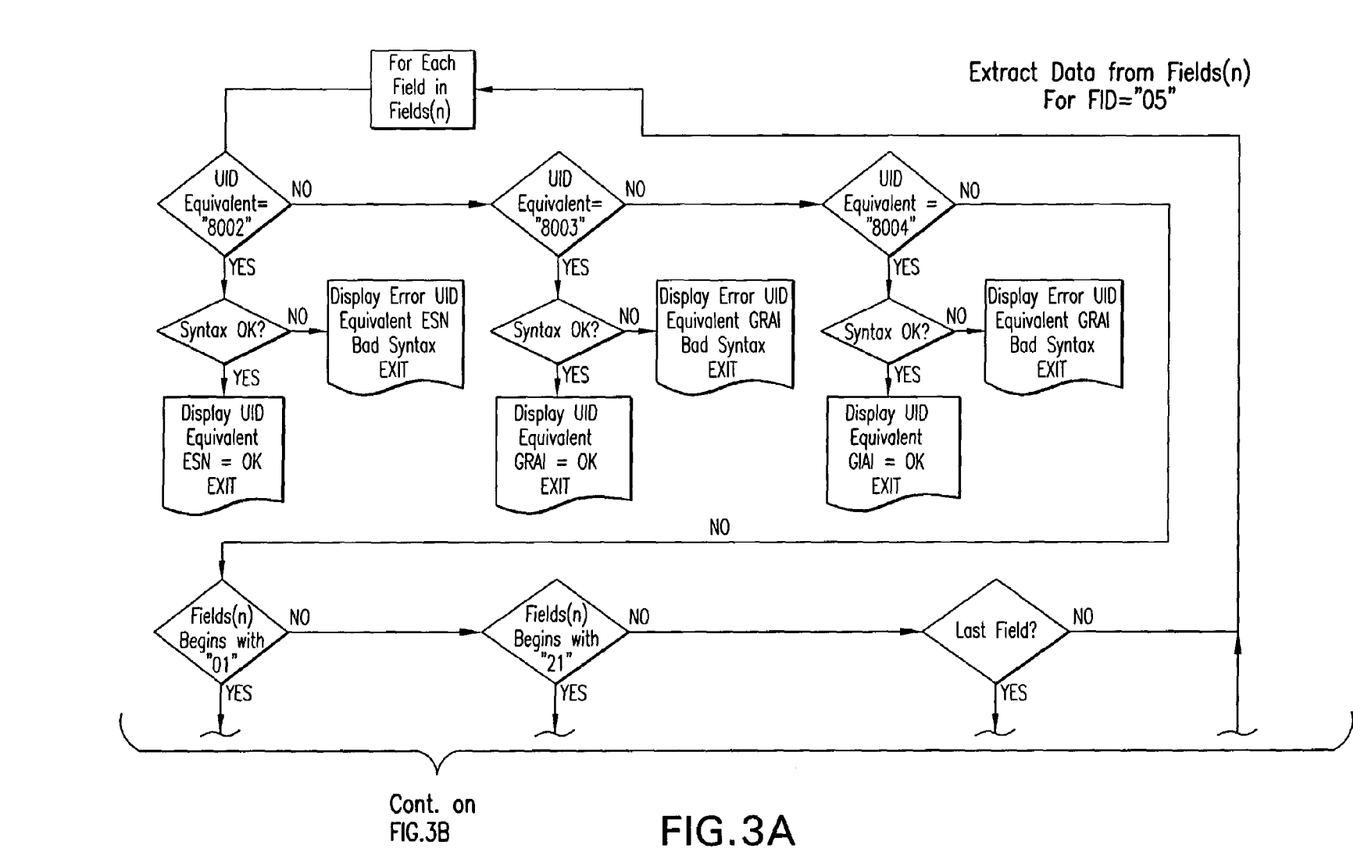
Figure 3B:
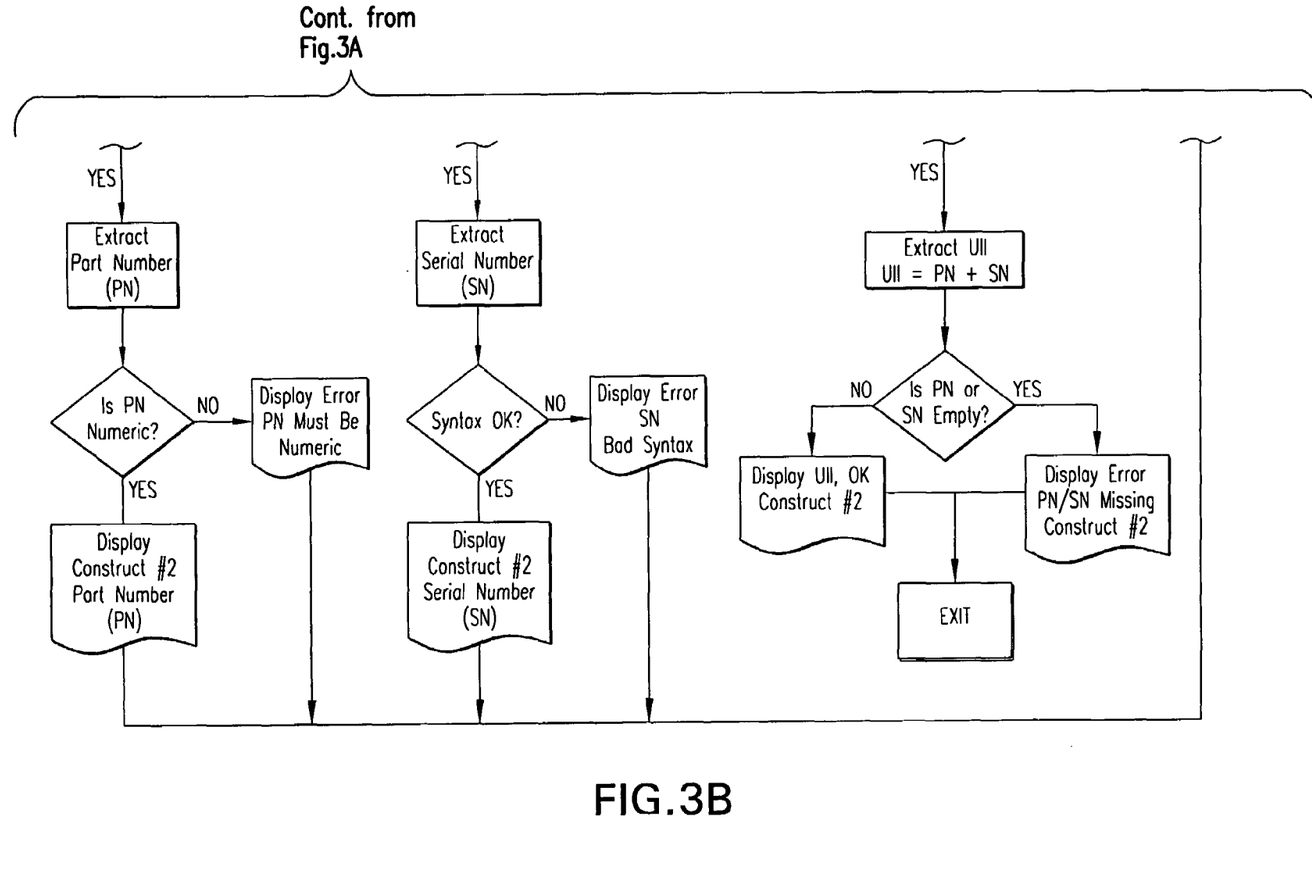

Referring now to FIGS. 3A and 3B, to validate data that has been determined to be encoded in accordance with the "05" convention, the program searches each field for a text element identifier for concatenated unique item identifier (UID), specifically UID Equivalent="8002", "8003", and "8004". In the case where the "8002" field syntax is OK, a message is displayed (Display UID Equivalent ESN=OK) indicating the electronic serial number is OK. If the "8003" field is OK, a message is displayed (Display UID Equivalent GRAI=OK) indicating the global returnable asset identifier is OK. If the "8004" field is OK, a message is displayed (Display UID Equivalent GIAI=OK) indicating the global individual asset identifier is OK. Otherwise an error message is displayed. As also illustrated in FIG. 2B, the fields beginning with "01" and "21" are likewise tested to extract the part number PN (Extract Part Number PN) and the serial number SN (Extract Serial Number SN) respectively. If the part number is numeric (Is PN Numeric?), the construct #2 part number is displayed (Display Construct #2 Part Number). Similarly, if the syntax of the serial number is OK, the construct #2 serial number is displayed (Display Construct #2 Serial Number). Otherwise an error message is displayed. After the program has processed each field in the message (Last Field?), the unique item identifier (UII), which is the sum of the part number PN and the serial number SN is formed (Extract UII) and displayed so long as both the PN or SN fields are occupied (Is PN or SN empty?).

Figure 4A:
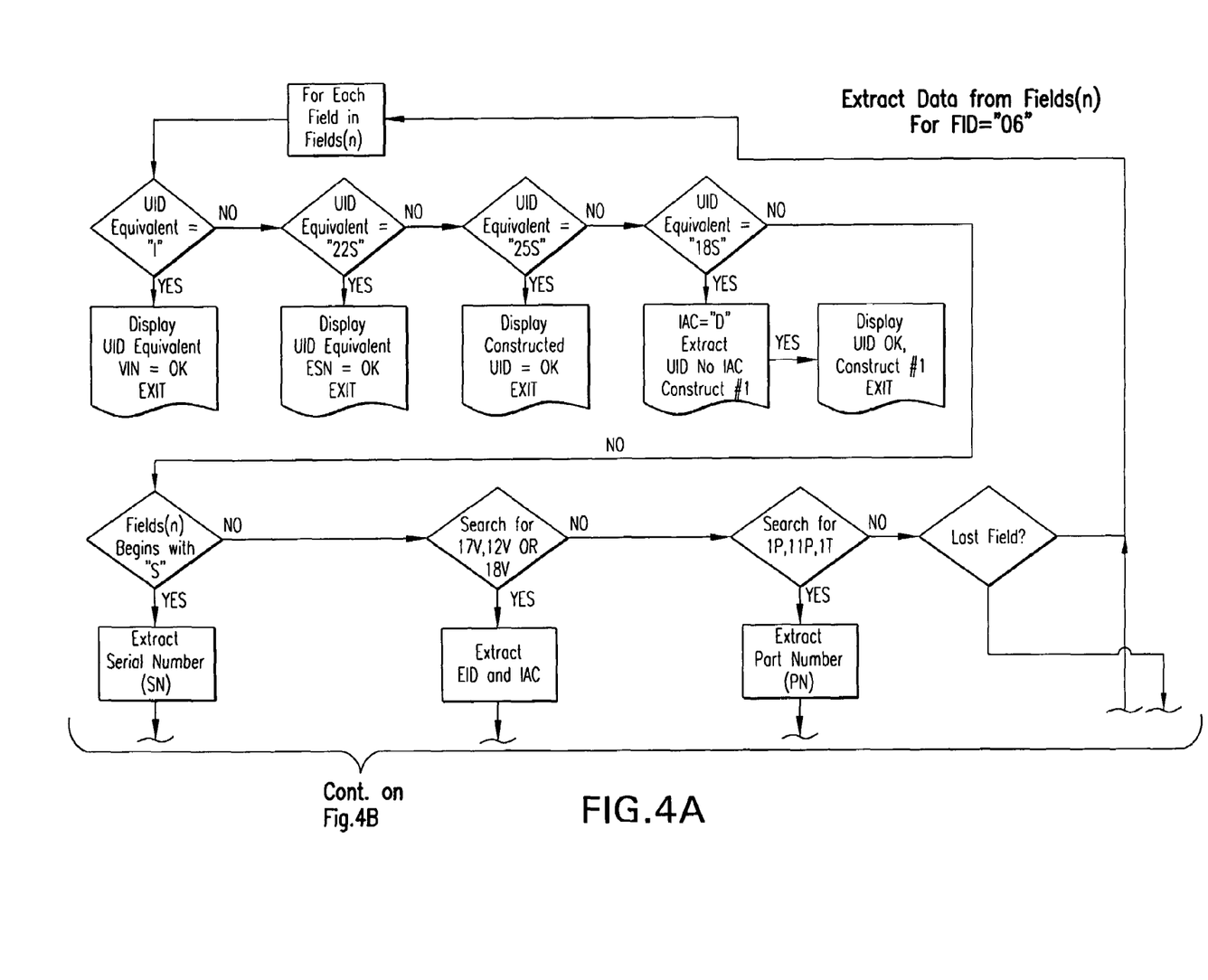
Figure 4B:
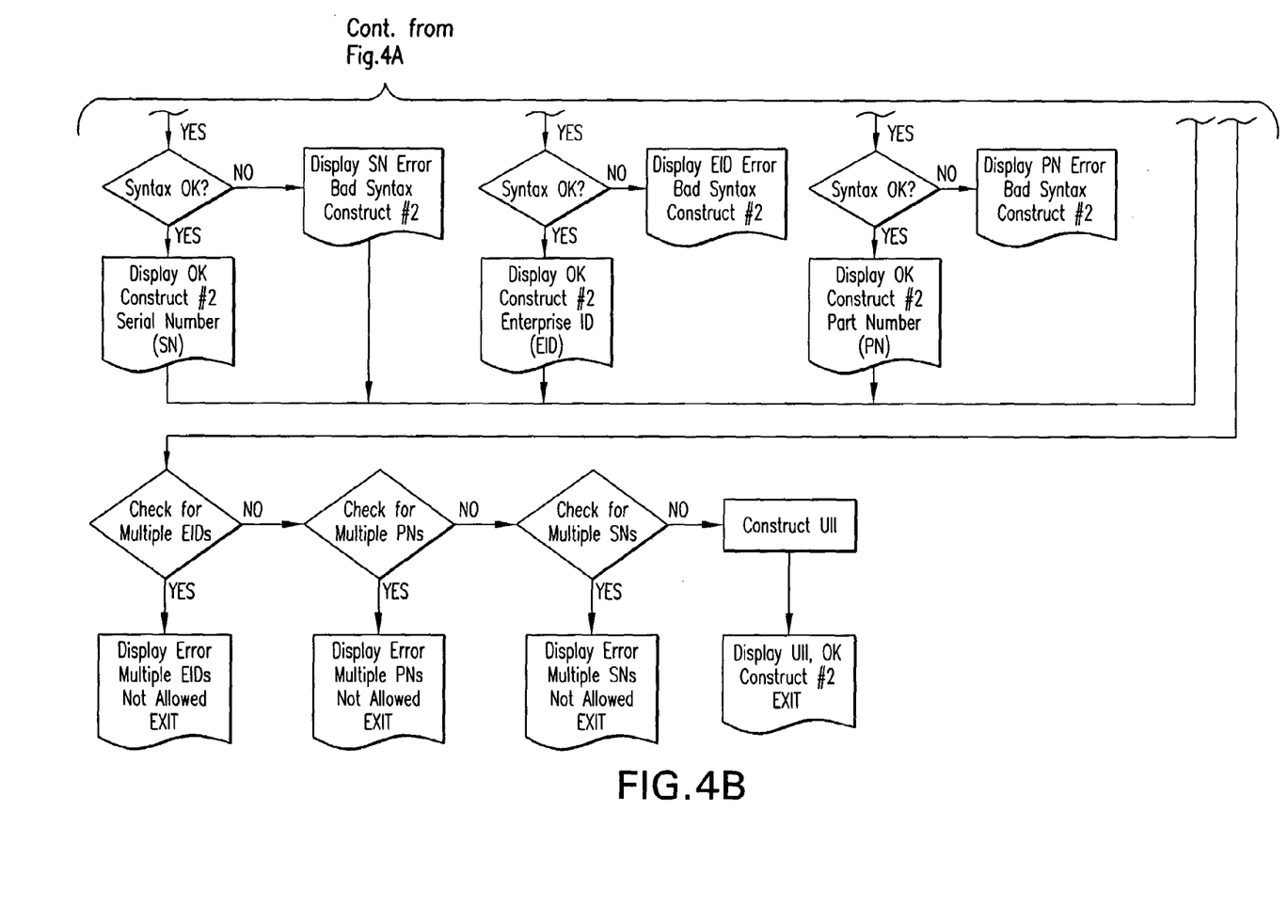
Figure 5A:
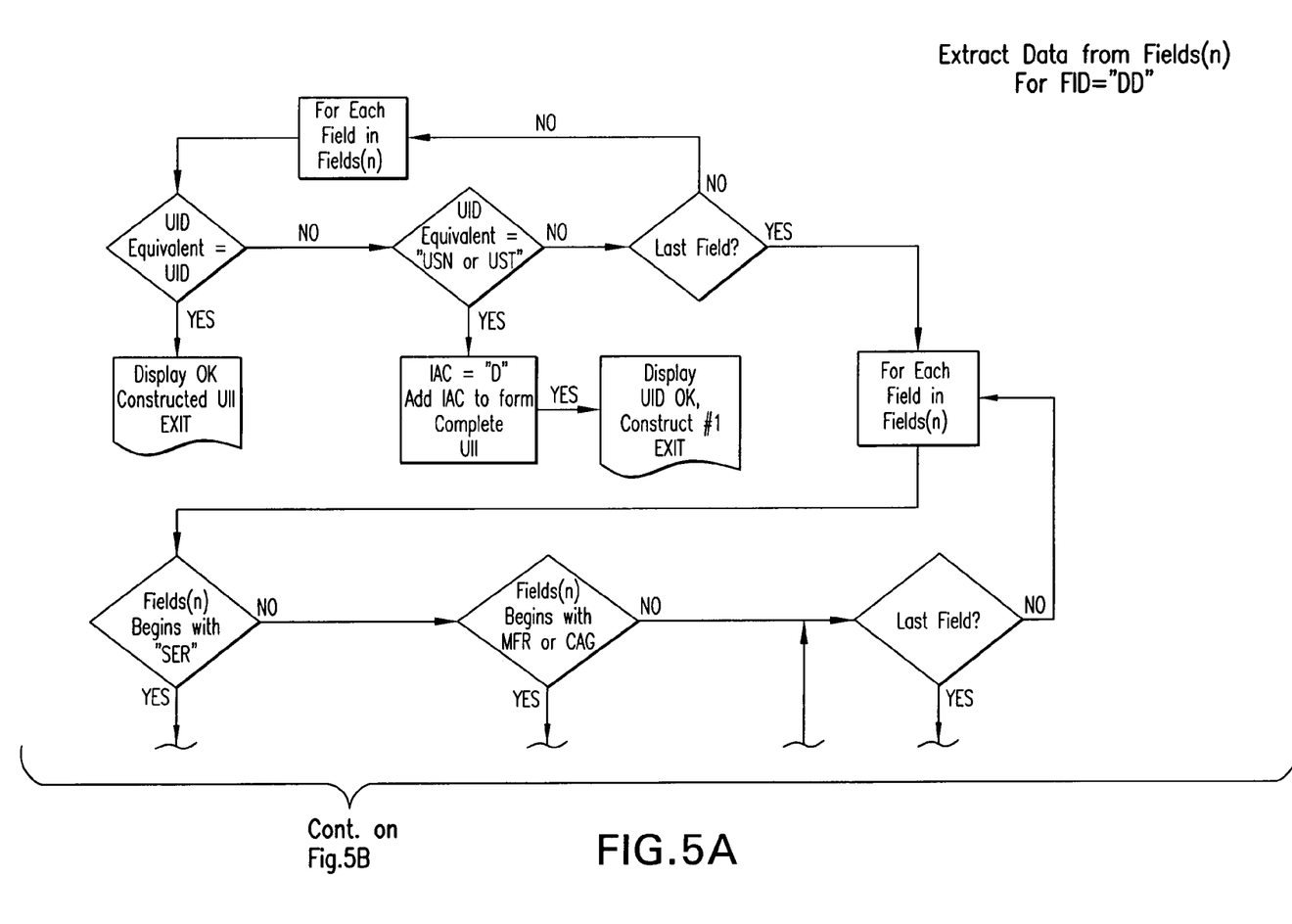
Figure 5B:
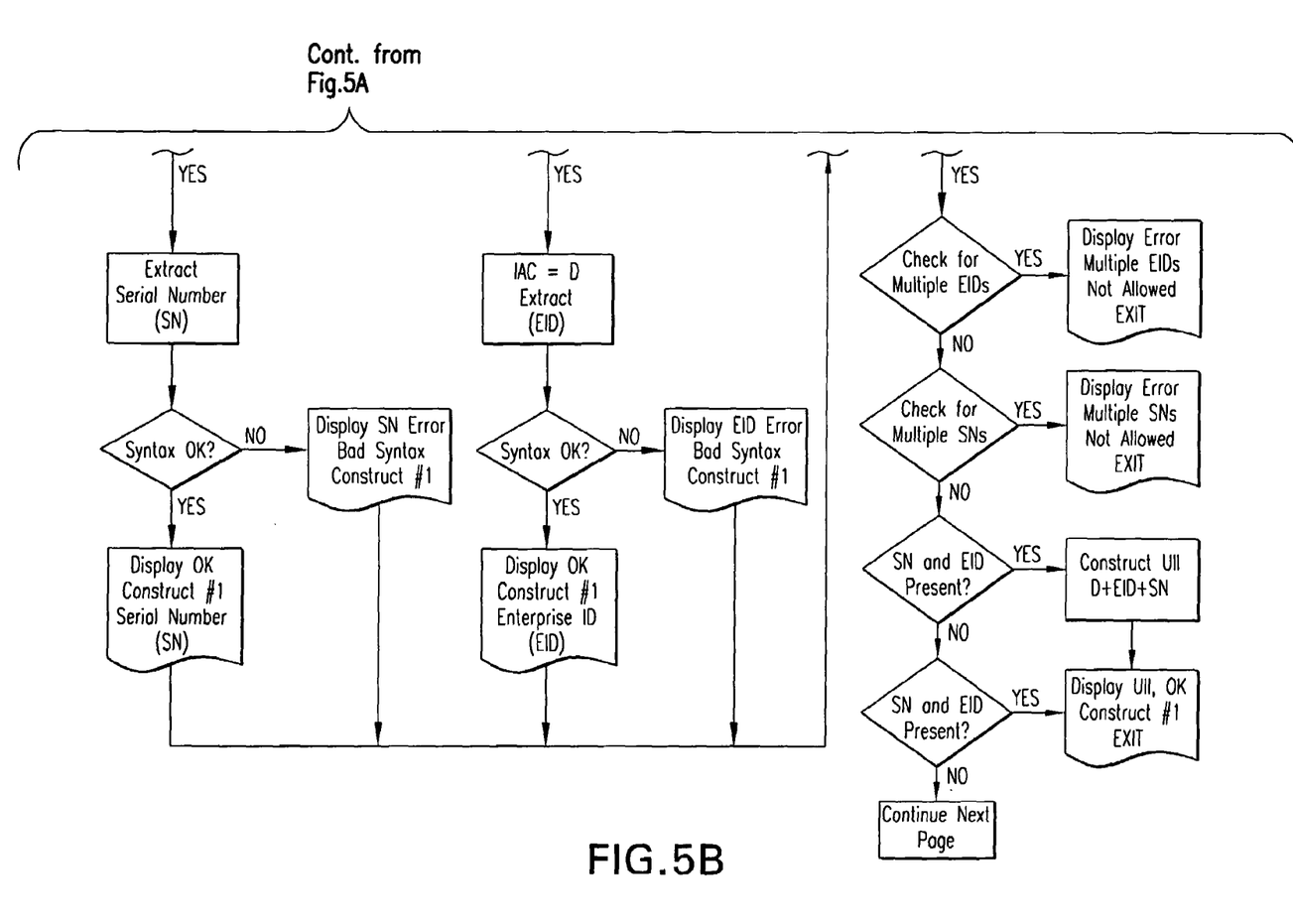
Figure 6:
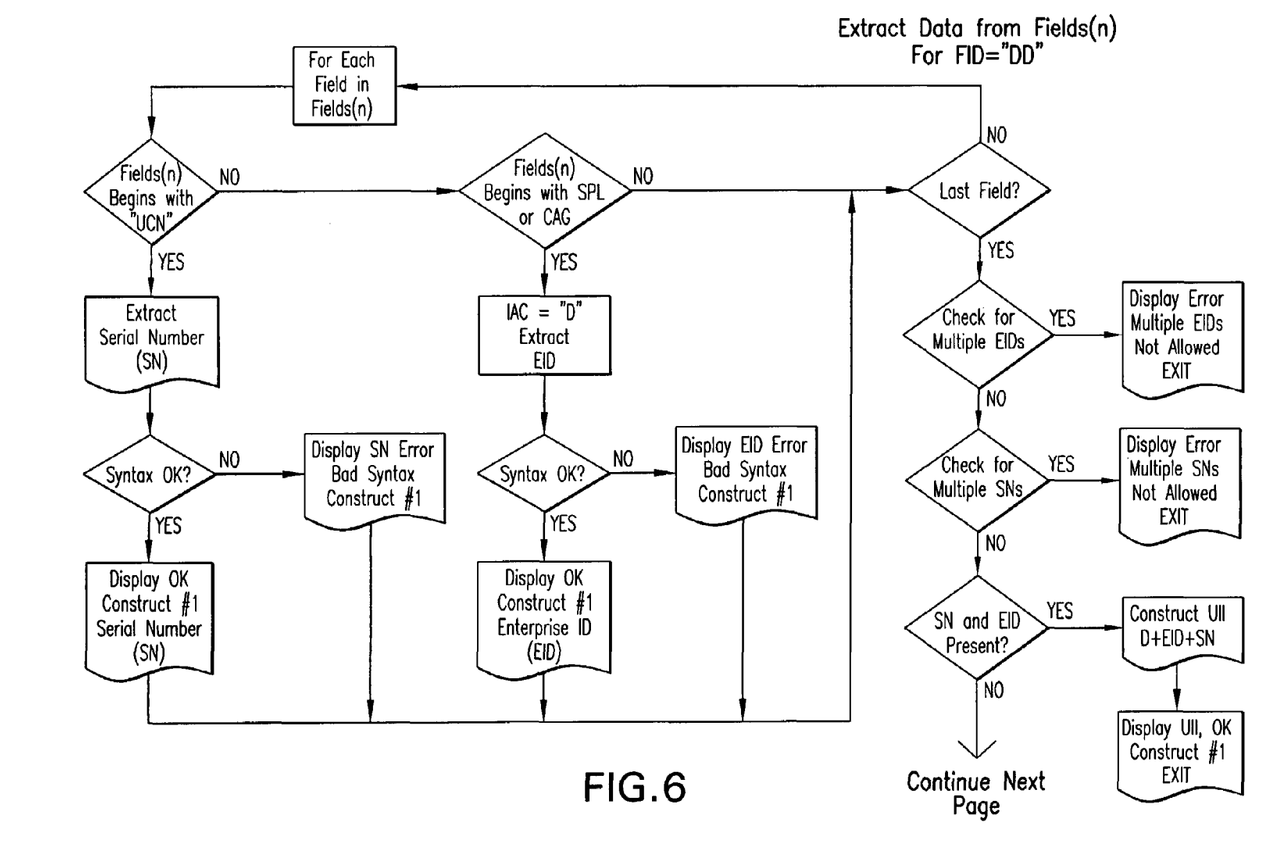
Figure 7A:
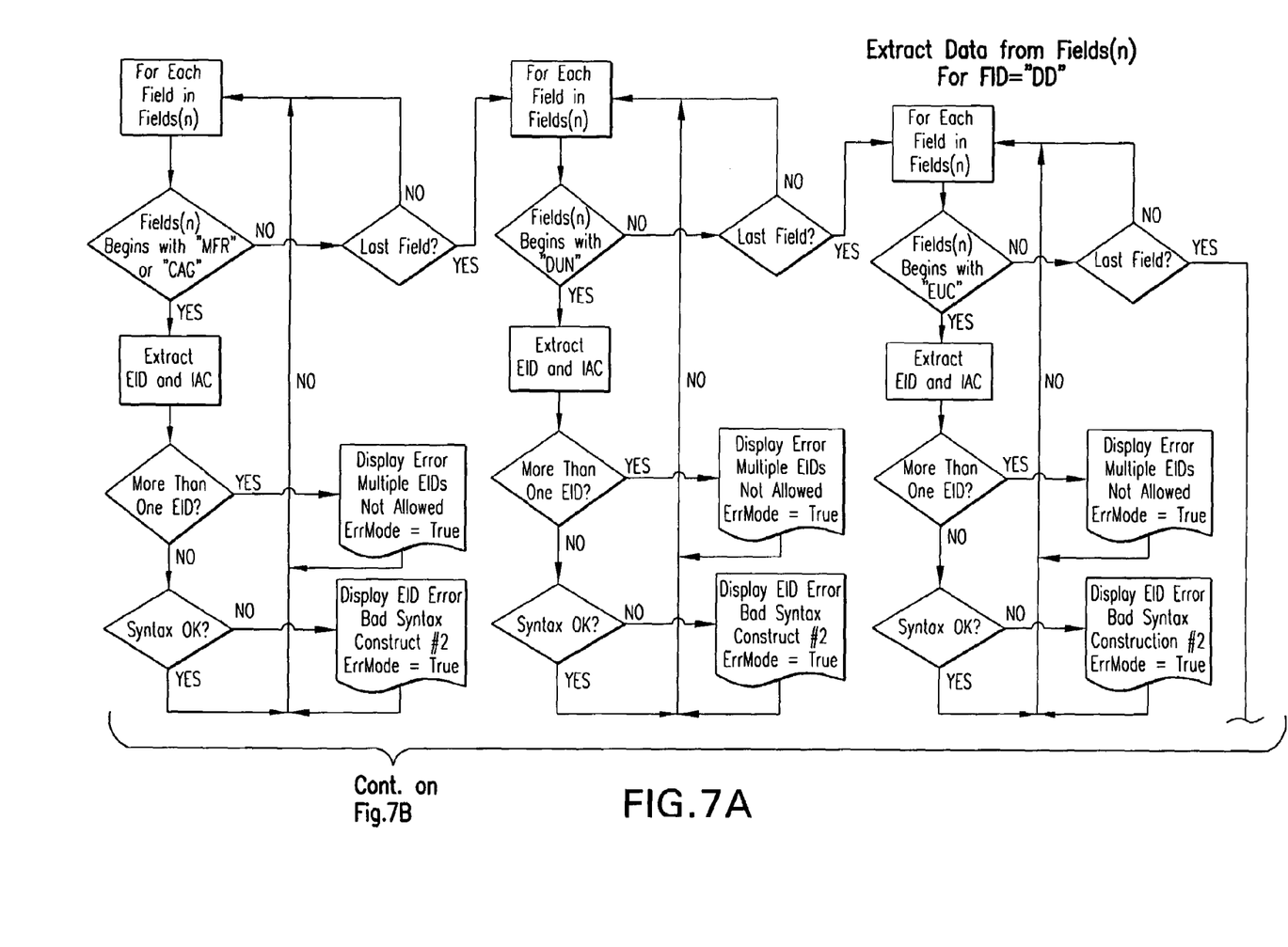
Figure 7B:
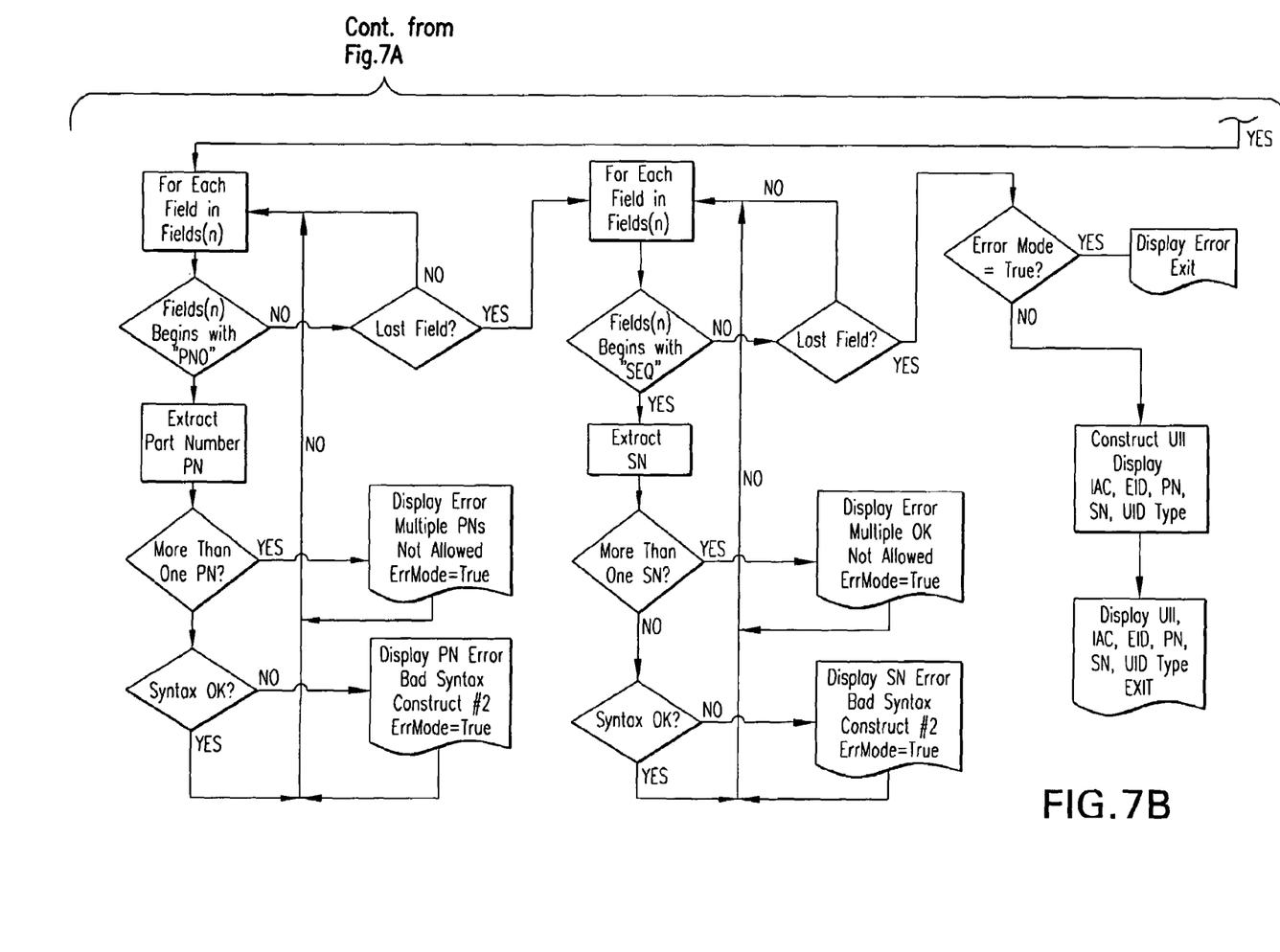

Referring now to FIGS. 4A and 4B, to validate data which has been encoded in what has been determined to be in accordance with the "06" convention, the program searches each field initially for a text element identifier for concatenated unique item identifier (UID) equivalent for "I", "22S", "25S", or "18S". If anyone of these is found, and the appropriate OK message is displayed, namely vehicle identification number (VIN), electronic serial number (ESN), unique identifier (UID), or an issuing agency code (IAC) for CAGE numbers. If none are found, the program proceeds to search that field for "S" or "17V, 12V, or 18V" or "1P, 11P, or 1T" at the beginning of the field. If found, a serial number SN, an enterprise identifier EID and issuing agency code IAC, or part number PN is extracted, the syntax checked and an OK or error message displayed as appropriate. The process repeats until the last field is detected. When detected, the program checks for multiple EIDs, PNs, and SNs, which are not allowed in the construct. If found, an error message is displayed, otherwise the OK message is displayed.

Referring now to FIGS. 5A, 5B, 6, 7A and 7B, to validate data which has been encoded in what has been determined to be in accordance with the "DD" convention, the program searches initially each field for UID and a text element identifier of universal serial number formed by concatenating the text element identifier for CAGE code of the manufacturer (USN) or the text element identifier of universal serial tracking number formed by concatenating the text element code for CAGE code of an Enterprise other than the manufacturer and the text element identifier for unique component number assigned by an enterprise other than the manufacturer (UST). When each field has been examined (LAST FIELD?) the program proceeds to look at each field to detect fields that begin with a text element identifier for a serial number assigned by the manufacturer (SER) and fields that begin with the text element identifier for the commercial and government entity code of the manufacturer (MFR) or the text element identifier for a commercial and government entity (CAG). The serial number SN and enterprise identifier (EID) are extracted, if present, checked for syntax, and the result displayed.

After all the fields have been examined (LAST FIELD), the program checks for multiple EIDs and SNs and to see that both an SN and an EID were extracted from one of the fields examined. If there are multiple EIDs or SNs, an error message is displayed and the program stops. If one SN and one EID have been extracted, a UII is constructed, and an OK message displayed. If this procedure has not detected an SN or an EID or both, the program proceeds to look at each field for a field beginning with a text element identifier for a unique component number assigned by an enterprise other than the manufacturer (UCN). If found, the serial number SN is extracted and checked. If not found, the field is checked for a beginning code sequence of the text element identifier for CAGE code of an enterprise other than the manufacturer (SPL) or the text element identifier for CAGE (GAG). If present in a field, the EID is extracted, checked, and the result displayed. As before, the program checks for multiple EIDs and SNs and, if not, displays an error and exits. If SN and BID are both present a UII is constructed, OK displayed, and the program exits. If SN or EID or both are missing, the program proceeds. All fields are examined repeatedly. First for fields beginning with a text element identifier for CAGE code of the manufacturer (MFR) or the text element identifier for CAGE (GAG); next for the text element identifier of DUNS number (DUN), next the text element identifier for European article numbering or uniform code council (EUC), next the text element identifier for original part number (PNO) and finally the text element identifier for serial number assigned within the original part number. EID and IAC are extracted if one of the codes at the beginning of any field begins with CAG, DUN, or EVC. EID and IAC are checked, and if an error is detected and error mode indicator is set to true. The part number PN is extracted if the code at the beginning of any field begins with PNO and the serial number SN is extracted if the code at the beginning of any field begins with SEQ. The part number PN and serial number SN are checked for errors and, if an error is found, the error mode indicator is set to true. After all the fields have been examined by each of the subroutines, the program checks to see if the error mode indicator has been set by any of the subroutines (Error Mode True). If true, an error is displayed and the program exits. If the Error mode is not true, the UII is constructed and displayed along with IAC, EID, PN, SN, and UID Type.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A computer program embodied on a computer-readable medium for testing a unique item identifier data stream for conformity to one of a plurality of prescribed permissible codes, including the steps of:

searching the data stream for a header common to all of the prescribed permissible codes;

displaying an error message if said header is not found;

searching the data stream for a last character;

displaying an error message if said last character is not found;

searching the data stream between said header and said last character for field separator characters that designate fields within said data stream;

searching the data stream for a semantic format identifier of one of said plurality of prescribed permissible codes;

displaying an error message if a semantic format identifier of one of said plurality of prescribed permissible formats is not found;

storing said semantic format identifier;

testing each of said fields in a series of iterative program steps determined by said semantic format identifier.

2. A computer program embodied on a computer-readable medium for testing a unique item identifier data stream for conformity to one of a plurality of prescribed permissible codes as in claim 1 wherein said testing of each of said fields step includes testing for an electronic serial number.

3. A computer program embodied on a computer-readable medium for testing a unique item identifier data stream for conformity to one of a plurality of prescribed permissible codes as in claim 1 wherein said testing of each of said fields step includes testing for a global returnable asset identifier.

4. A computer program embodied on a computer-readable medium for testing a unique item identifier data stream for conformity to one of a plurality of prescribed permissible codes as in claim 1 wherein said testing of each of said fields step includes testing for a global individual asset identifier.

5. A computer program embodied on a computer-readable medium for testing a unique item identifier data stream for conformity to one of a plurality of prescribed permissible codes as in claim 1 wherein said testing of each of said fields step includes testing for part number.

6. A computer program embodied on a computer-readable medium for testing a unique item identifier data stream for conformity to one of a plurality of prescribed permissible codes as in claim 1 wherein said testing of each of said fields step includes testing for a serial number.

7. A computer program embodied on a computer-readable medium for testing a unique item identifier data stream for conformity to one of a plurality of prescribed permissible codes as in claim 1 wherein said testing of each of said fields step includes testing for a unique item identifier.

8. A computer program embodied on a computer-readable medium for testing a unique item identifier data stream for conformity to one of a plurality of prescribed permissible codes as in claim 5 wherein said testing of each of said fields step includes testing for a unique item identifier.

9. A computer program embodied on a computer-readable medium for testing a unique item identifier data stream for conformity to one of a plurality of prescribed permissible codes as in claim 6 wherein said testing of each of said fields step includes testing for a unique item identifier.

* * * * *